United States Patent
Ivanov et al.

(10) Patent No.: US 11,550,993 B2
(45) Date of Patent: Jan. 10, 2023

(54) INK EXPERIENCE FOR IMAGES

(71) Applicant: Microsoft Technology Licensing, LLC, Redmond, WA (US)

(72) Inventors: Sergei Ivanov, Issaquah, WA (US); Panos C. Panay, Redmond, WA (US); Ales Holecek, Kirkland, WA (US); Ali Akgun, Seattle, WA (US); Maxim Kudryavtsev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/998,325

(22) Filed: Dec. 24, 2015

(65) Prior Publication Data
US 2016/0259766 A1 Sep. 8, 2016

Related U.S. Application Data

(60) Provisional application No. 62/129,894, filed on Mar. 8, 2015.

(51) Int. Cl.
*G06F 40/169* (2020.01)
*G06F 3/04845* (2022.01)
(Continued)

(52) U.S. Cl.
CPC ........ *G06F 40/169* (2020.01); *G06F 3/04845* (2013.01); *G06F 16/5866* (2019.01);
(Continued)

(58) Field of Classification Search
CPC .. G06F 17/241; G06F 40/169; G06F 3/04845; G06F 40/171; G06V 30/36
See application file for complete search history.

(56) References Cited

U.S. PATENT DOCUMENTS 5,608,872 A 3/1997 Schwartz et al.
5,680,636 A * 10/1997 Levine .................... G06F 3/033
715/201

(Continued)

OTHER PUBLICATIONS

Gonzalo Ramos et al., Fluid Interaction Techniques for the Control and Annotation of Digital Video, 2003, UIST 03, vol. 5, Issue 2, pp. 111-112.*

(Continued)

*Primary Examiner* — Scott T Baderman
*Assistant Examiner* — Seung Woon Jung
(74) *Attorney, Agent, or Firm* — NovoTechIP International PLLC

(57) ABSTRACT

Techniques for an ink experience with images are discussed herein. In various implementations, an image is displayed via an image management application for viewing and/or editing images. In conjunction with interaction scenarios provided via the application, an inking mode for adding inked annotations to the image is enabled. Input to apply one or more inked annotations to the image is obtained, such as via finger touches on a touchscreen, drawing with a stylus, camera-based gestures, or other natural input mechanisms. Responsive to obtaining the input, data blocks corresponding to the one or more inked annotations are appended to an image file as additional data blocks for the image.

12 Claims, 14 Drawing Sheets

(51) Int. Cl.
*G06F 40/171* (2020.01)
*G06F 16/58* (2019.01)
*G06V 30/32* (2022.01)
*G06V 30/226* (2022.01)
*G06T 11/60* (2006.01)

(52) U.S. Cl.
CPC .......... *G06F 40/171* (2020.01); *G06V 30/226* (2022.01); *G06V 30/36* (2022.01); *G06T 11/60* (2013.01)

(56) References Cited

U.S. PATENT DOCUMENTS

| | | | |
|---|---|---|---|
| 6,128,446 A | 10/2000 | Schrock et al. | |
| 7,218,783 B2 | 5/2007 | Bargeron et al. | |
| 7,519,900 B2 | 4/2009 | Zaher et al. | |
| 7,546,525 B2 | 6/2009 | Bargeron | |
| 8,041,120 B2 | 10/2011 | Zhang et al. | |
| 8,347,206 B2 | 1/2013 | Gear et al. | |
| 2006/0050969 A1 | 3/2006 | Shilman et al. | |
| 2006/0071915 A1* | 4/2006 | Rehm | G06F 1/1616 345/173 |
| 2007/0196033 A1* | 8/2007 | Russo | G06F 17/30525 382/305 |
| 2007/0250901 A1 | 10/2007 | McIntire | |
| 2008/0062141 A1* | 3/2008 | Chandhri | G06F 3/0482 345/173 |
| 2009/0119590 A1* | 5/2009 | Kondziela | G06F 8/38 715/716 |
| 2009/0232417 A1 | 9/2009 | McMahan | |
| 2012/0218305 A1* | 8/2012 | Patterson | G06F 17/2235 345/652 |
| 2014/0245123 A1* | 8/2014 | Pircher | G06F 17/241 715/232 |
| 2015/0149428 A1* | 5/2015 | Smith | G06F 3/0482 707/706 |
| 2015/0269431 A1* | 9/2015 | Haji | G06K 9/00879 382/186 |

OTHER PUBLICATIONS

"International Search Report and Written Opinion Issued in PCT Application No. PCT/US2016/020307", dated May 20, 2016, 10 Pages.

"Second Written Opinion", Application No. PCT/US2016/020307, dated Aug. 26, 2016, 6 pages.

"International Preliminary Report on Patentability Received From PCT Application No. PCT/US2016/020307", dated Dec. 6, 2016, 7 Pages.

Olsen,"ScreenCrayons: Annotating Anything", In Proceedings of 17th Annual ACM Symposium on User Interface Software and Technology Available at: <http://icie.cs.byu.edu/Papers/ScreenCrayons/ScreenCrayonsPaper.pdf>, Oct. 24, 2004, 10 pages.

Shneiderman,"Direct Annotation: A Drag-and-Drop Strategy for Labeling Photos", In Proceedings: IEEE International Conference on Information Visualization Available at: <http://drum.lib.umd.edu/bitstream/1903/1068/2/CS-TR-4129.pdf>, Jul. 19, 2000, 9 pages.

Wenyin,"Semi-Automatic Image Annotation", In Proceedings of Interact: Conference on Human-Computer Interaction Available at: <http://131.107.65.14/en-us/um/people/sdumais/Interact2001.pdf>, Jul. 9, 2001, 8 pages.

Wilkins,"Annotating Documents with the Surface Pro Tablet and Pen", Retrieved From: <http://surfaceprobro.blogspot.in/2013/07/annotating-documents-with-surface-pro.html> Mar. 31, 2015, Jul. 1, 2013, 5 pages.

* cited by examiner

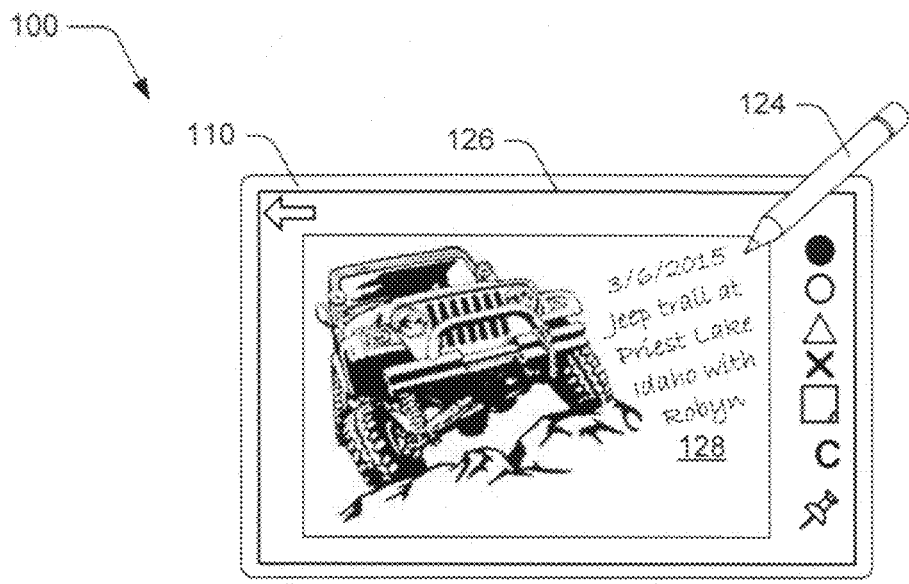
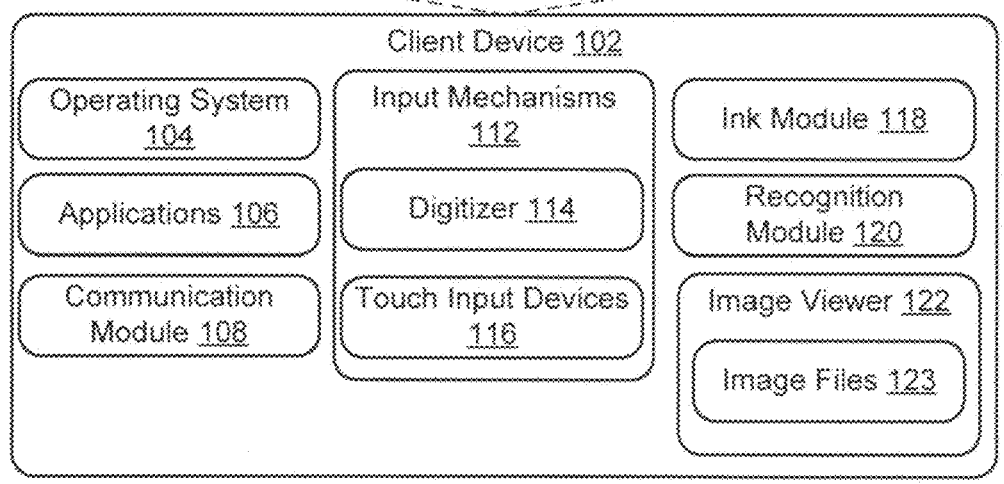
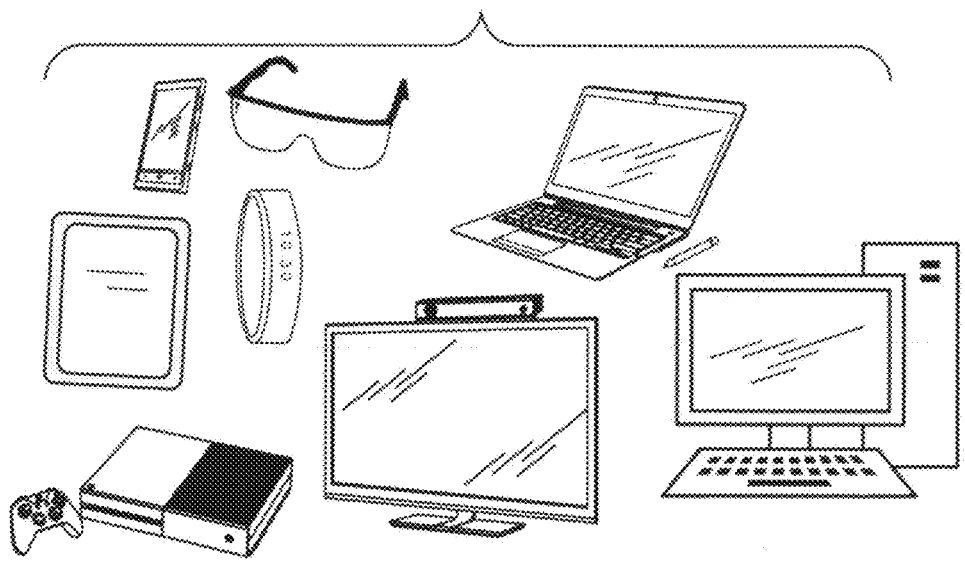
Fig. 1

INK EXPERIENCE FOR IMAGES

PRIORITY

This Application claims priority to U.S. Provisional Patent Application No. 62/129,894, filed Mar. 8, 2015, and titled "Ink Experiences for Images," the disclosure of which is incorporated by reference in its entirety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 1 is an illustration of an example environment that is operable to employ techniques discussed herein in accordance with one or more implementations.

DETAILED DESCRIPTION

Overview

Figure 2:
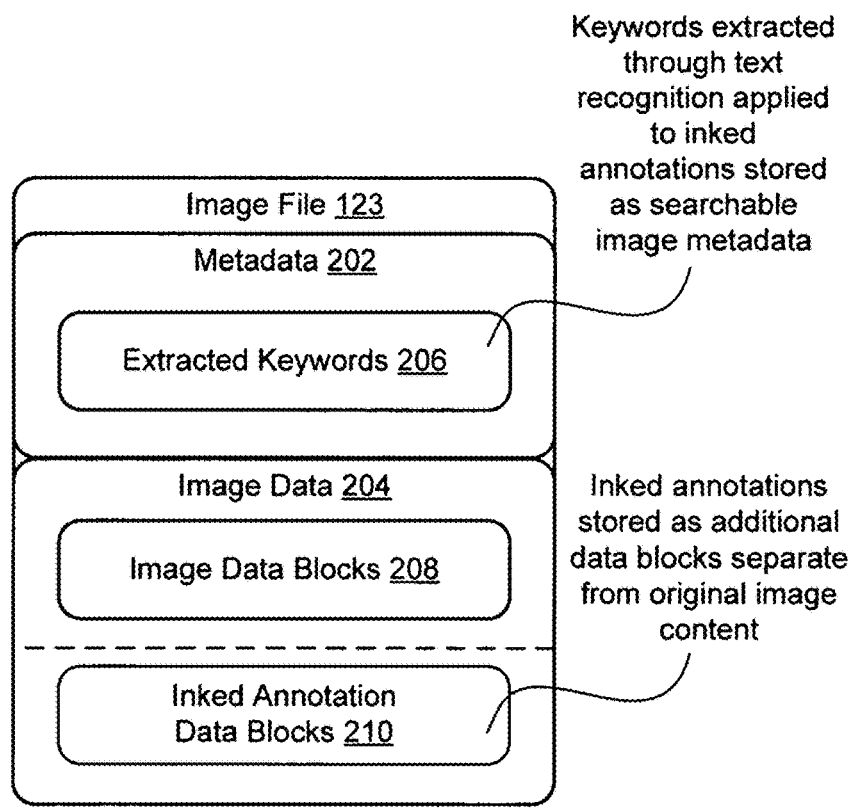
FIG. 2 depicts an example image file in accordance with one or more implementations.

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to touch-sensing functionality such as a touchscreen, which is interpreted as digital ink. The freehand input may be converted to a corresponding visual representations on a display, such as for taking notes, for creating and editing an electronic document, annotations, and so forth.

Techniques for an ink experience with images are discussed herein. In various implementations, an image is displayed via an image management application for viewing and/or editing images. In conjunction with interaction scenarios provided via the application, an inking mode for adding inked annotations to the image is enabled. Input to apply one or more inked annotations to the image is obtained, such as via finger touches on a touchscreen, drawing with a stylus, camera-based gestures, or other natural input mechanisms. Responsive to obtaining the input, data blocks corresponding to the one or more inked annotations are appended to an image file as additional data blocks for the image.

For example, a photo or other image file can be opened in an image viewer that supports using images as inking canvases. Through inking functionality supported by the image viewer, a digital pen/stylus (or other input mechanism) may be used to add annotations to the image by draw traces on the image in a natural manner. In addition, handwriting can be recognized as keywords into textual form and stored as searchable metadata of the image. The extracted keywords can also be displayed in views of the image in addition to or in lieu of showing the original handwriting. The image can also be virtually flipped over to write additional information on a back side representation of the image. Thus, the handwritten annotations can be saved both as textual metadata and as raster ink content.

The data blocks for the inked annotations (e.g., raster ink content) and textual metadata are saved within the image file and separate from original photo content. Accordingly, the image is fully preserved both in substance and in quality and does not have to be recompressed. The data is embedded into the original image in a transparent manner that does not interfere with existing image viewing and editing programs. Because extracted keywords are saved as metadata, image management operations that rely on metadata can leverage the keywords derived from inked annotations. Such image management operations include but are not limited to searching, filtering, categorizing, and sorting of digital images. Overall, the experience is designed to emulate in the digital image management environment familiar ways in which individuals manage physical photos (e.g., instant photos and chemically processed photographic prints), such as writing of dates, names, places and other information on the back of the photos, in margins, on attached notes, and so forth.

In the following discussion, an example environment is first described that is operable to employ techniques described herein. Next, a section entitled "Example Implementation Scenarios and Procedures" describes some example implementation scenarios and methods for ink modes in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for ink modes discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in relation to FIG. 14.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represents functionalities for performing different tasks via the client device 102. Examples of the applications 106 include a word processing application, a spreadsheet application, a web browser, a gaming application, image management applications, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communicate over wired and/or wireless connections. For instance, the communication module 108 represents hardware and logic for communication via a variety of different wired and/or wireless technologies and protocols.

The client device 102 further includes a display device 110, input mechanisms 112 including a digitizer 114 and touch input devices 116, and an ink module 118. The display device 110 generally represents functionality for visual output for the client device 102. Additionally, the display device 110 represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), single or multiple finger touches, a mouse, a keyboard, a stylus, a touch pad, accelerometers, a microphone with accompanying voice recognition software, and so forth. The input mechanisms 112 may be separate or integral with the displays 110; integral examples include gesture-sensitive displays with integrated touch-sensitive or motion-sensitive sensors. The digitizer 114 represents functionality for converting various types of input to the display device 110 and the touch input devices 116 into digital data that can be used by the computing device 102 in various ways, such as for generating digital ink.

According to various implementations, the ink module 118 represents functionality for performing various aspects of inking techniques discussed herein. In general, the ink module 118 enables input in the form of a natural handwriting experience, such as by tracing with a finger or using a pen/stylus to make "ink runs" that are captured and interpreted via the ink module 118. Movements to create the ink runs are captured and displayed as digital writing via the display device. The effect is like writing on paper with liquid ink. The ink module 118 may support different inking modes, ink characteristics (e.g., color, sizes, pen types, etc.), operations and interaction scenarios.

In one or more implementations, the ink module 118 includes or makes use of a recognition module 120. The recognition module 120 represents functionality to apply handwriting recognition algorithms and techniques to recognize text from handwriting. The ink module 118 may invoke the recognition module 120 to process ink runs and recognize text corresponding to the ink runs (e.g., characters, words, dates, symbols, numbers, etc.). In an implementations, the ink module 118 is configured to provide an option to convert ink runs to text. In addition or alternatively, the ink module 118 can identify and extract keywords based on handwriting recognition applied to ink runs. Thus, applications can utilize and display either or both of a raster ink image of an ink run and corresponding text derived from the ink run in various ways and combinations via suitably configured user interfaces and elements provided by the applications.

In accordance with techniques describe herein, functionality of the ink module 118 and recognition module 120 is utilized to provide ink experiences for digital images (e.g., digital photography). For example, the client device 102 further includes an image viewer 122 that represents various functionality for management and processing of image files 123 and image collections. Functionality provided by the image viewer 122 to manage images may include but is not limited to functionality to organize, access, browse and view images, as well as to perform various kinds of image processing operations upon selected images. The image viewer 122 can support many different kinds of image formats, example of which include but are not limited to JPEG, PNG, GIF, TIFF, vector graphics formats, bitmap formats, and the like. The image viewer 122 is also configured to support ink experiences for images as discussed above and below. The ink experiences may be supported by invoking the functionality of ink module 118 and recognition module 120. In an implementation, the ink module 118 and recognition module 120 are provided as integrated components of the image viewer 122. Alternatively, the ink module 118 and recognition module 120 are implemented as system components (e.g., OS components) that are accessible to provide inking functionality to multiple applications 106 of the device (including the image viewer 122) via corresponding APIs, communication mechanisms, and interaction scenarios.

The environment 100 further includes a pen 124 (e.g., smart pen or stylus), which is representative of an input device for providing input to the display device 110. Generally, the pen 124 is in a form factor of a traditional pen but includes functionality for interacting with the display device 110 and other functionality of the client device 102. In at least some implementations, the pen 124 is an active pen that includes electronic components for interacting with the client device 102. The pen 124, for instance, includes a battery that can provide power to internal components of the pen 124. Alternatively or additionally, the pen 124 may include a magnet or other functionality that supports hover detection over the display device 110. This is not intended to be limiting, however, and in at least some implementations the pen 124 may be passive, e.g., a stylus without internal electronics. Generally, the pen 124 is representative of an input device that can provide input that can be differentiated from other types of input by the client device 102. For instance, the digitizer 114 is configured to differentiate between input provided via the pen 124, and input provided by a different input mechanism such as a user's finger, a stylus, and so forth.

Image files 123 may be displayed via a user interface 126 of the image viewer 122 that is output via the display device 110. Then, the pen 124 may be employed to for digital handwriting in which inking runs are made to add inked annotations 128 to image files as represented in FIG. 1. A user interface 126 to facilitate inking in connection with images can have various different configurations and provide any suitable user interface instrumentalities, elements, menus, and controls examples of which are shown and described in the document. Further details regarding these and other aspects of ink experiences for images are discussed in relation to the following figures.

Having described an example environment in which the techniques described herein may operate, consider now a discussion of an example details, scenarios, and procedures in accordance with one or more implementations.

Example Details, Scenarios, and Procedures

As introduced above, techniques described herein enhance digital imaging and photography experiences with utility of natural handwriting and computer handwriting recognition. The techniques enable users to quickly place ink on photos and other images 123 in any context, and later perform textual searches for keywords recognized in the handwritten annotations. Digital ink is saved with the image data in a manner that is not disruptive or damaging to image content. Additionally, filtering and sorting can be performed based on keywords, dates, or any other information recognized from handwriting on digital photos.

To do so, images 123 are presented via the image viewer 122 as an inkable canvas. Ink can be handwritten into onto a main body of an image itself, on margins and/or on a back side of the image. Additional note pages can also be added if desired. The image viewer 122 provides user interface elements operable to navigate between multiple different views and locations where inked annotations may be added. Accordingly, navigation can occur via the image viewer 122 to switch between views of (a) the original image, (b) the image as inkable canvas, (c) the image as inkable canvas with borders/margins, (d) an inkable representation of a back side of the image, (e) alternate note pages of the image (e.g., corresponding to in real world sticky notes or pages associated with the image).

In implementations, transitions occurs from "passive" viewing of photos to "active" inking on photos via the inkable canvas. The transitions are implemented to switch between at least two different modes that provide different options, tools, visual characteristics, and functionality for interacting with images. For instance, in a viewing mode, image size is maximized to show the image as large as possible within a view pane on the screen. In an inking mode, additional controls are exposed for selection of ink tools and/or altering of ink characteristics such as color, thickness, and line type. Further, in inking mode additional areas and views to facilitate inked annotations may be exposed, such as rendering margins for ink around the presentation of the image and/or adding areas and controls to implement back side and note page inked annotations as described above and below.

Consequently, switching between different interaction modes (including at least the viewing mode and inking mode) may be accompanied with various visual transitions to signal and/or enhance the switch between modes. For example, photos may initially be displayed via a view pane in the viewing mode of the image viewer 122. In an implementation, the image viewer 122 subscribes to receive pen input notifications, such as via the OS, an input module, or other functionality configured to recognize, handle, and manage input via a pen 124 and/or other input mechanisms. By so doing, the image viewer 122 may obtain different notifications regarding pen interaction including at least "pen hover" notifications. A pen hover notification is triggered when the user's pen is some small distance away from the digitizer surface, before touching the surface.

To implement inking, the image viewer 122 is configured to treat the pen hover notifications as commands to switch to the inking mode. Thus, a switch from viewing mode to inking is triggered responsive to receiving a pen hover notification and the visual display is altered accordingly to expose appropriate functionality for inking. In one or more implementation, the mode switch is represented by an animated transition from a full screen photo in viewing mode to a reduced size, framed photo view in inking mode that is surrounded by margins as wells as additional tool bars, areas, and UI elements related to inked annotations. The animated transitions provide visual feedback effective to inform users that inking mode is enabled and inking is now active. Naturally, a transition back to viewing mode may occur in a comparable manner responsive to selection of a toggle control, a timeout, or other input configured to switch back to viewing mode.

When inking mode is enabled, ink input provided via the image viewer 122 is captured. The pen input notifications to which the image viewer 122 subscribes include events indicative of the input ink traces. The events may include but are not limited to system input messages describing locations (e.g., coordinates) and details of traces/input, as well pen-down and pen-up events. Using the pen input notifications, the image viewer 122 is able to obtain and store individual ink point coordinates for inking runs that occur between pen-down and pen-up events. A collection of inking runs for an image forms an ink document for the image that can be stored along with the image itself.

In particular, individual ink runs for inked annotations are stored in a space efficient, compressed manner. Individual ink traces can be distinguished as contiguous traces and/or using a timer-based approach to determine how to group and separate different traces as different inking runs. In one approach, ink data blocks are immediately and efficiently appended to the image file as the ink runs are created by the user. For example, inking runs are stored as additional data blocks within the image file in a corresponding format. Any suitable image format can be employed including but not limited to JPEG, PNG, GIF, TIFF, vector graphics formats, bitmap formats, and other image formats. The data blocks for ink is stored separate from, and does not interfere with the original image content. In implementations, the ink runs can be stored as a vector objects allowing individual annotations to be repositioned, recolored, resized or deleted. These individual inked annotations are selectable individually to allow such modifications. Multiple vector objects for a collection of inking runs corresponding to an image taken together form an ink document as noted previously.

Storing the ink runs as appended data block as they are being created reduces the possibility of data loss between the time of entry of ink and the time that ink is saved. It also means a user does not have to manually select a "save ink" option, thereby simplifying the process and reducing the steps a user has to perform to create annotations. Further, re-writes of the image file to storage media in its entirety can be reduced since just the most recent run of ink is appended to the end of the file.

Additionally, the image data is separated from the inked annotation data, which ensures that there is no continued image pixel content and/or image quality loss as ink is added in subsequent editing sessions. This also means the original image is available for printing or display without ink, and the ink does not interfere with programs that are not aware of the ability to associate ink with photos. Further, the system can be configured to selectively show or hide the ink to support toggling the annotations on/off, and also to turn ink off so it does not appear in miniature thumbnail representations (and other small image representations) that would create illegible representations of the inked annotations.

In an implementation, the ink annotations are stored inside image files and are encoded using a defined image format, such as JPEG file format. Here, the ink is stored "side by side" with the image data. As such the ink runs are not incorporated into the image itself, and thus the image is preserved in its original state. Consequently, (1) the image is available in is original form for viewing, printing, and other interactions, and (2) image quality losses due to recompressing when the image is saved are avoided since modifications of the ink are made and saved separately from the image data and therefore without any degradation of the image.

In operation, ink can be added to the image file by first opening the file for write access and resetting the current file pointer to the end of file. Then, image segments are read backwards to detect any "INK" segments. If the beginning the beginning of the file is reached without finding an "INK" segment (meaning the image file has no existing ink data in it), the current file pointer is reset to the end of file. If an "INK" segment is found, the read operation is stopped and the current file pointer is positioned at the beginning of the "INK" segment. Now, the "INK" segment is written at the current file pointer location. The added ink is written as a compressed collection of ink strokes (e.g., individual ink point coordinates) as discussed previously. Now, an End-Of-File marker is placed at current location. This truncates the file in case the new "INK" segment is shorter than the existing "INK" segment found in the file.

The system also supports techniques for keyword extraction and utilization, via a recognition module 120 or other comparable functionality. As runs of ink are created, the recognition module 120 can apply handwriting recognition algorithms to extract textual representations from ink traces. When words, dates, and other text terms are recognized, the terms are extracted as keywords and stored as image metadata. Keywords can then be employed later for searching, filtering, categorizing, sorting, and other metadata/keyword based management of a collection of digital images.

In an implementation, the user interface 126 is configured to expose keywords recognized for inked annotations to facilitate viewing, editing and/or verification of the keywords. For example, upon recognition of keywords, a tooltip, a balloon, pop-up, separate window/frame or another visual element can be displayed in connection with the ink run to show corresponding keywords. This enables a user to visually confirm accuracy of handwriting recognition. Further, the visual element may support editing of the keywords using standard textual input mechanisms, such as textbox control. This enables a user to recognize and correct any mistakes in the computer recognized text as well as to input additional keywords if desired. An instrumentality such as a "close" button or icon can be provided to remove the recognized textual representation without removing ink. In addition or alternatively, an instrumentality such as a "delete" button or icon can be provided to remove the ink run altogether, along with recognized textual representation and keywords.

In this context, FIG. 2 depicts generally at 200 an example image file 123 in accordance with one or more implementations. In this example, the image file includes metadata 202 and image data 204. The metadata 202 is represented as having extracted keywords 206 that are derived from inked annotations in the manner described herein. The image data 204 includes image data blocks 208 that correspond to original image content. The image data 204 additionally is represented as having inked annotation data blocks 210. The inked annotation data blocks 210 may be configured to hold images of ink runs (e.g., rasterized ink data) for annotations. As represented, the inked annotation data blocks 210 may be appended to the image data 204 and stored in a manner that keeps the inked annotation data blocks 210 distinguishable from the image data blocks 208. This may occur in any suitable way. For example, different separate portions of the image data 204 may be defined to achieve separation of original content and rasterized ink data. In one approach, different portions are separately tagged in a manner that enables an image viewer 122 that is "ink-aware" to recognize the ink annotations and handle corresponding inked annotation data blocks 210 separately from include image data blocks 208. However, an image application that is "not ink-aware" may not recognize the inked annotation data blocks 210 or may ignore them based on the tagging (or other suitable distinctions). Thus, image applications that are not ink-aware handle the image data blocks 208 in a typical manner and the inclusion of corresponding inked annotation data blocks 210 in the image file does not interfere with operation of such applications, or alter the image data blocks 208 for the original image content.

To further illustrate, consider the following example scenarios and procedures for providing ink experiences with images in accordance with one or more implementations. The scenarios and procedures may be implemented in the environment 100 described above, the system 1400 of FIG. 14, and/or any other suitable environment. The scenarios and procedures, for example, describe example operations of the client device 102. While the implementation scenarios and procedures are discussed with reference to a particular application, it is to be appreciated that techniques discussed herein are applicable across a variety of different applications, services, and environments. In at least some embodiments, steps described for the various procedures are implemented automatically and independent of user interaction.

Figure 3:
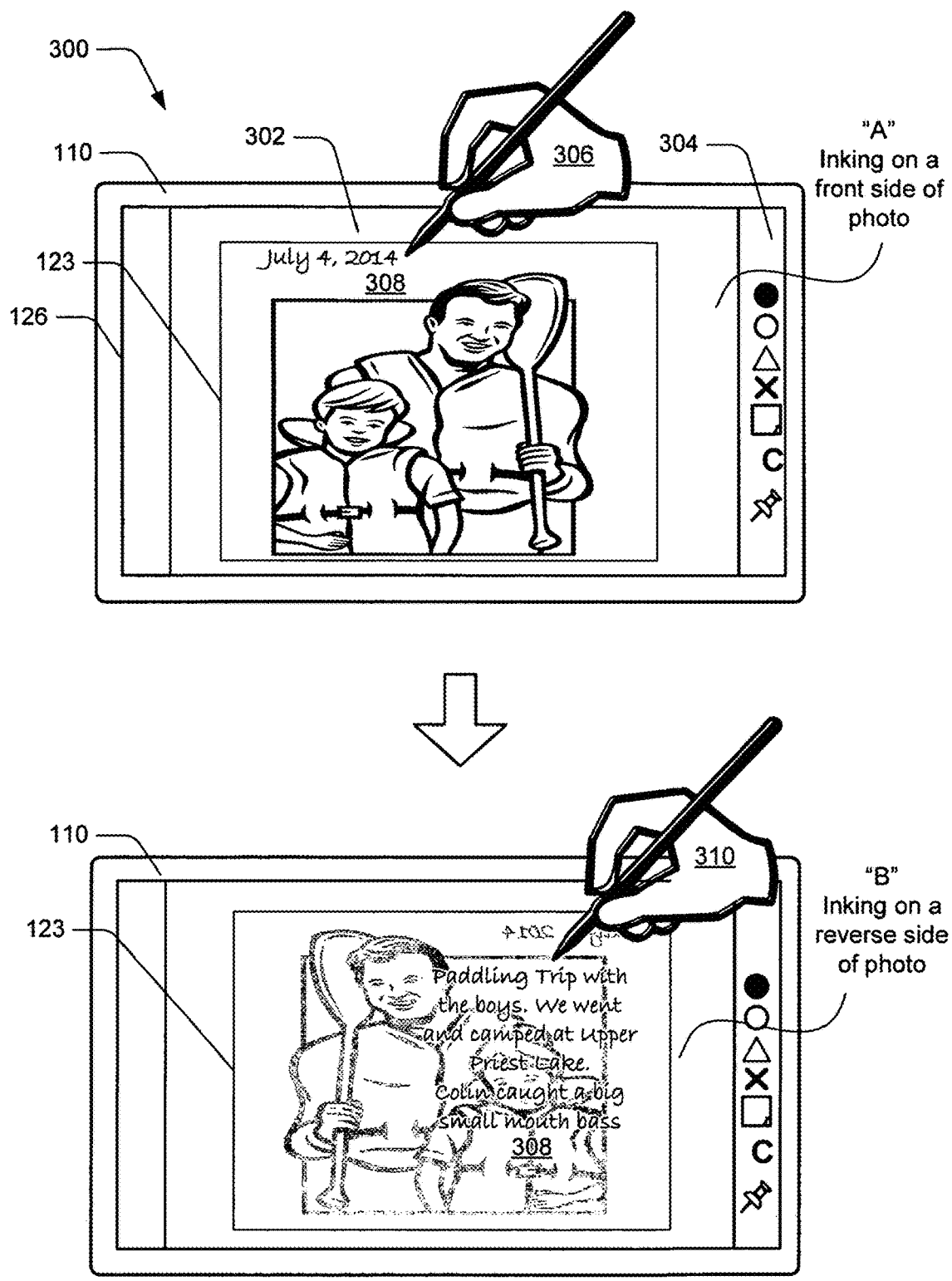
FIG. 3 depicts example scenarios for adding inked annotations to an image in accordance with one or more implementations.

FIG. 3 depicts generally at 300 example scenarios for adding inked annotations to an image in accordance with one or more implementations. In particular, inking on a front side of a photo is represented by view "A". Here, an image 123 is depicted as being displayed via a user interface 126 that is output by a display device 110. The user interface 126 may correspond to an image viewer 122 or other applications that provide functionality for interaction with images. The example user interface includes a content portion 302 in which representations of images are displayed and a functional portion 304 that represents various menus, toolbars, UI elements, options, controls, and functions that can be accessed to facilitate interaction with items presented via the content portion 302. In this example, a toolbar having multiple selectable tools is represented although other implementations of the UI are also contemplated.

Interaction with options provided by the user interface 126 and/or functional portion 304 enables a user to selectively activate an inking mode in connection with display and interaction with images. For example, the user may provide explicit input to activate an inking mode (menu selection, gesture, click a button, etc.) or simply start writing with a pen/stylus to activate inking. As noted, the inking mode supports addition of annotations to a front side and a reverse/back side of the image, as well as to note pages that can be added to the image. In an implementation, virtual borders and/or margins can also be added to provide additional space surrounding the image for annotations.

Further, view "A" represents interaction 306 to cause the addition of an inked annotation 308 to the image. The inked annotation 308 can be input using a pen 124 as illustrated or other suitable input mechanism, some examples of which were discussed previously. In particular, the date "Jul. 4, 2014" is depicted as being added on a front side of the image 123, such as in a margin region of the image.

In general, a pleasing visual experience is provided that incorporates smooth rendering of ink strokes. To do so, ink strokes are captured and stored as a collection of ink point coordinates received between pen-down and pen-up events as previously noted. The resolution of ink point coordinates is typically hardware (digitizer) dependent, but may be adapted in different interaction scenarios to control the clarity of the ink and/or the digital size of stored ink. Ink traces are rendered as one or more curves fitted to the stored ink point coordinates. The curve fitting produces smoothness for the ink stroke and eliminates the appearance of jaggedness, in contrast to straight line fitting which is likely to result in some jaggedness.

Additionally, ink strokes are rendered at a magnification (zoom level) selected to match a current magnification for the underlying photo. Ink point coordinates, which are received in screen coordinates, are translated into image coordinates before being stored. This translation calculation occurs in dependence upon the currently selected magnification level. Thus, the ink traces are stored relative to the coordinate system of the image rather than in zoom specific coordinates. Consequently, ink traces may be smoothly reproduced in an image using curve fitting techniques regardless of the current magnification. It is noted that ink smoothing as just described is critical when ink is drawn at low magnification (e.g., when the image is small on the screen). This is because apparently-small distances between adjacent ink points will become large when the image is viewed at 1:1 magnification or higher. Unless ink strokes are rendered as curves in the manner discussed herein, the jaggedness of lines connecting ink points becomes very apparent.

Interaction with options provided by the user interface 126 may enable a user to make a selection to reverse the image and expose a representation of a back side of the image. For example, a flip or reverse button or control element may be provided via the functional portion 304 or otherwise. In another approach, a gesture such as a swipe, page turn, or a natural pick and flip action/gesture can be implemented to switch between views. Responsive to a selection to reverse the image, a transition may occur to expose the back side, such as a transition from view "A" to view "B" of FIG. 3. Comparable actions or inputs may be applied to switch back in the other direction. Various animations and visual transitions may be employed to visually represent changes between these views as well as for switching between any other available views supported by the system, additional examples of which are discussed in this document.

Accordingly, view "B" represents exposure of the reverse side or back side of the image 123. Optionally, a phantom, "grayed-out" or faded representation of the image itself (e.g. the front side) may be shown (as illustrated) in the view from the back side to provide a visual clue that the photo is flipped. Alternatively, a representation of a blank back side may appear. In view "B" with the image reversed, interaction 310 causes insertion of another inked annotation 308 this time on the back side of the image 123. Accordingly, the system supports inking on both front and back representations of images.

Figure 4:
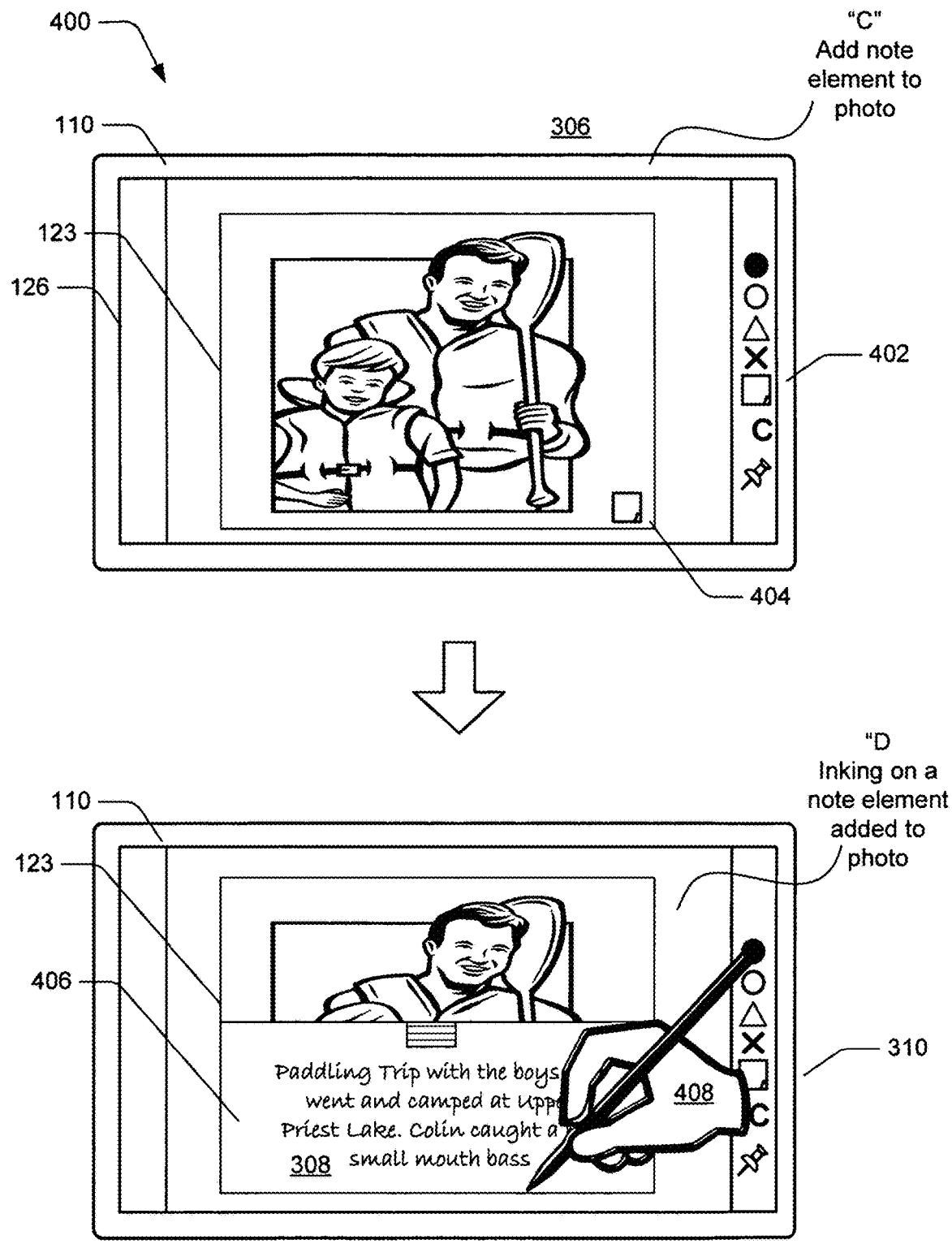
FIG. 4 depicts additional example scenarios for adding inked annotations to an image in accordance with one or more implementations.

FIG. 4 depicts generally at 400 additional example scenarios for adding inked annotations to an image in accordance with one or more implementations. As noted, the system additionally support inking on note pages or elements that can be added to image files 123. This is akin to attaching sticky notes, or affixing note pages to a physical photo using pins, paper clips, tape, etc. A variety of different techniques, UI elements, and configurations to represent and utilize such notes are contemplated. By way of example and not limitation, a few illustrative examples and details related to using notes for inked annotations are represented in views "C" and "D" of FIG. 4.

View "C" represents a scenario in which a selection is made to add a note to an image 123. In this example, an add note option 402 can be provided via a tool bar (as illustrated), a menu, a gesture, a button/control of a pen 124 or other suitable mechanism. The add note option 402 is selectable to create an additional note element that is associated with the image 123. The note element provides additional space and/or space that does not conceal the image itself that can be used for notes. Data related to notes can be appended to an image file 123 in the same manner as data is appended for inked annotation data blocks 210. Further, tags or other distinctions can be included with the data to separate the note representations from image data and/or annotations. Data sufficient to form notes can also be included as part of the inked annotation data blocks 210 in some implementations. One or multiple different notes may be associated with the same image.

Notes can be represented in various ways using different kinds of visual elements. For example, notes can be configured using one or more of balloon elements, note pages, slide-out boxes, tabbed portions, margins, a collapsible window, and so forth. A visual clue regarding association of a note can optionally be provided. For example, in view "C" an attachment element 404 in the form of a note icon is represented as being shown in the corner of the image responsive to creating the note via the add note option 402. Other attachment elements 404 are also contemplated such as representation of a paper clip, pin, tape, sticky note, etc. In addition or alternatively, notes may be accessible by input to open separate windows or frames, by selections of a note toggle button from a tool bar, by menu navigation, and so forth.

In this example, though, attachment element 404 is selectable to expose the note. In particular, interaction with the attachment element 404 causes a transition from view "C" to view "D" in which a corresponding note element 406 is exposed. In this example, the note element 406 is configured as a slide-out note box that can be selectively shown and hidden through the attachment element 404 and/or other toggle controls. In different implementations, the image and notes may be configured as a stack of pages, using different tabs, side-by side, as a scrollable page(s), or other suitable techniques to represent the notes as separate regions, which can be used for annotations. Other examples are also contemplated. In this view, interaction 408 causes insertion of another inked annotation 308 using the note element 406.

Example Procedures

Further aspects are discussed in relation to example procedure of FIGS. 5 to 8. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 5:
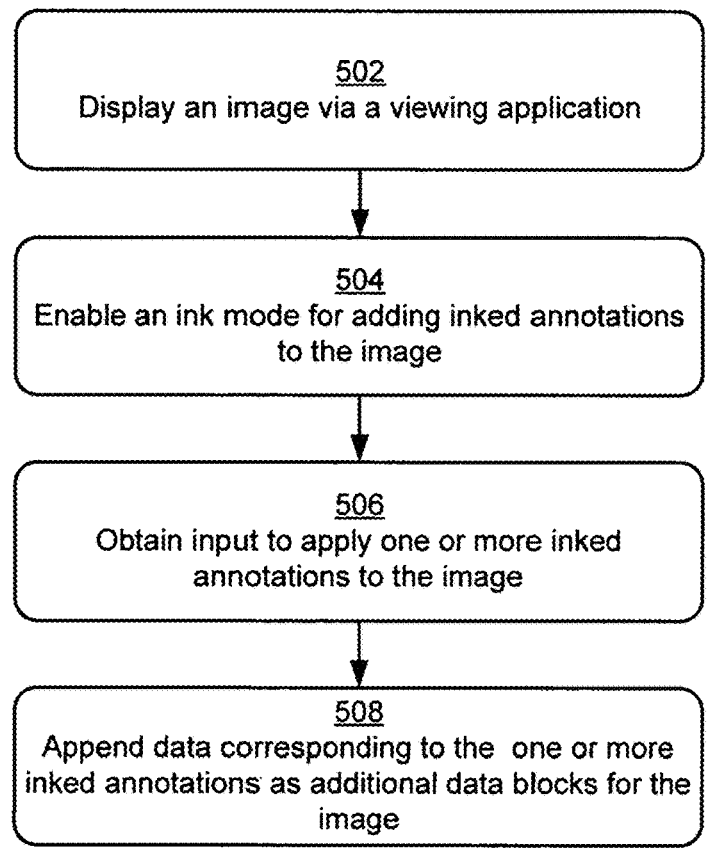
FIG. 5 is a flow diagram that describes a procedure for adding inked annotations to images in accordance with one or more implementations.

FIG. 5 is a flow diagram that describes a procedure 500 for adding inked annotations to images in accordance with one or more implementations. An image is displayed via a viewing application (block 502). Then, an ink mode for adding inked annotations to the image is enabled (block 504). Input to apply one or more inked annotations to the image is obtained (block 506). Responsive to the input, data corresponding to the one or more inked annotations is appended as additional data blocks for the image (block 508). For example, an image viewer 122 that supports inking via an ink module 118 can be utilized to add inked annotations to an image 123 as described in this document. Annotations can be added to various views of the image as noted herein. The inked annotations can be selectively shown or hidden in the various views. Data for the inked annotations is stored as part of images files 123, but kept separate from original image content.

Figure 6:
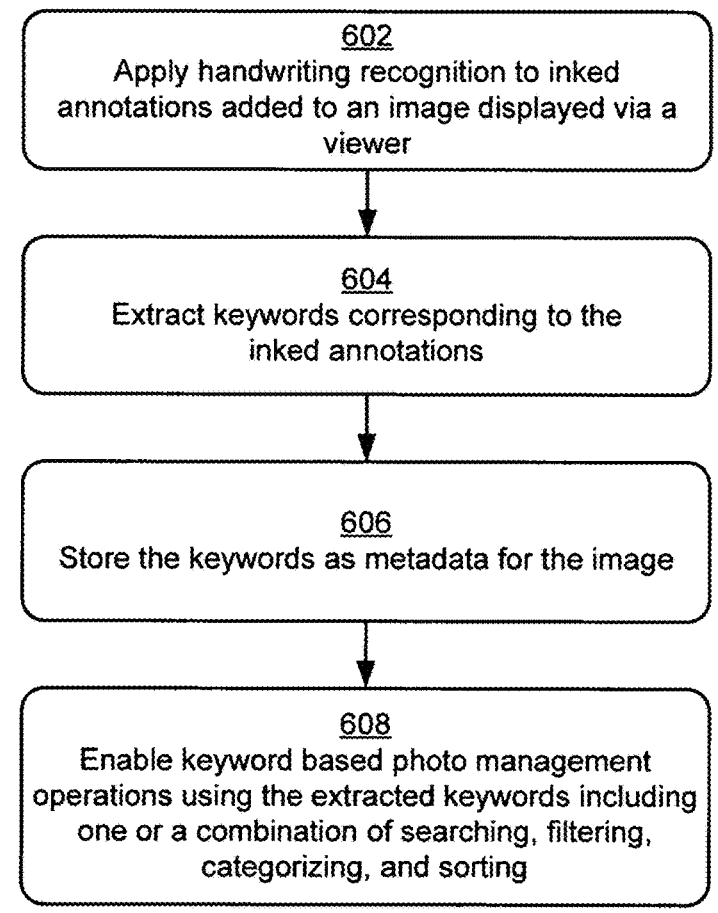
FIG. 6 is a flow diagram that describes a procedure for extracting keywords from inked annotations added to an image in accordance with one or more implementations.

FIG. 6 is a flow diagram that describes a procedure 600 for extracting keywords from inked annotations added to an image in accordance with one or more implementations. Handwriting recognition is applied to inked annotations added to an image displayed via a viewer (block 602). Keywords corresponding to the inked annotations are extracted (block 604). Then, keywords are stored as metadata for the image (block 606). Thereafter, keyword based photo management operations using the extracted keywords are enabled including one or a combination of searching, filtering, categorizing, and sorting (block 608). For example, an image viewer 122 can invoke a recognition module 120 to perform handwriting recognition upon inked annotations and extract corresponding keywords as described in this document. Keywords can be stored as searchable metadata for the image. The image viewer 122 as well as other applications can use the keywords for metadata/keyword based operations, such as to search for photos, organize a collection of photos, display metadata along with image representations, and so forth.

In one or more implementations, optical character recognition (OCR) is integrated into the inking mode and process of capturing ink runs to enable real-time recognition of handwriting and keywords. In particular, OCR may applied immediately as ink strokes are being input to detect whether the ink run corresponds to recognizable words or a sentence. When a textual string is recognized as a result of applying OCR to the ink stroke, the string is parsed into one or more keywords and may be associated with the captured ink run and/or stored as searchable metadata. The recognized textual string is then available for use in various ways to enhance the ink experience. For example, the textual string may be displayed via a tooltip anchor, pop-up text box, notification bar, side bar, toast message or other visual element responsive to a trigger, such as in response to hovering of a cursor over or in close proximity to a corresponding ink stroke. In other words, a live preview of the result of OCR on the ink run can be accessed via the inking user experience. Additionally, the textual string is also written to the image file metadata to facilitate keyword searches. Textual strings may also be displayed as keyword tags via a properties user interface, an example of which is depicted and discussed in relation to FIG. 10 below.

Note that OCR is a fallible technology and often produces erroneous result. To account for inaccuracy in OCR, the inking experience described in this document may incorporate an ink to text correction mechanism to enable user to confirm the results of OCR applied to ink runs. In particular, textual strings may be exposed to a user via various visual elements, example of which were described previously. In one approach, the visual element is revealed in close proximity to the ink stroke in response to designated interaction. For example, a tooltip anchor (or another "pop-up" visual element) may be selectively rendered to display text associated with an ink stroke when a cursor is hovered over or in close proximity to a corresponding ink stroke. In addition or alternatively, textual strings recognized from ink runs may be displayed via a dedicated inking element incorporated in the viewer UI, such as a window, UI pane, or side bar configured to expose a list of text strings corresponding to ink runs associated with the displayed image.

In one or more implementations, the text strings exposed via various visual elements are selectable to enable confirmation and/or correction of the results of OCR. Accordingly, the user has an opportunity to preview and modify or delete the keywords and tags generated for ink runs. In one approach, clicking on the textual string (or a suitable visual control exposed in the proximity of the textual string) launches a correction dialog (e.g. a text edit box or window). The textual string can then be corrected or entirely rewritten via the correction dialog. The correction dialog may also include controls to confirm textual strings generated by OCR (e.g., an OK or Enter button) and/or to remove the textual strings completely (e.g., a Delete or Erase button). When changes are made to textual strings and confirmation is obtained via the correction dialog, changes are saved into image file as metadata to facilitate keyword searches.

Figure 7:
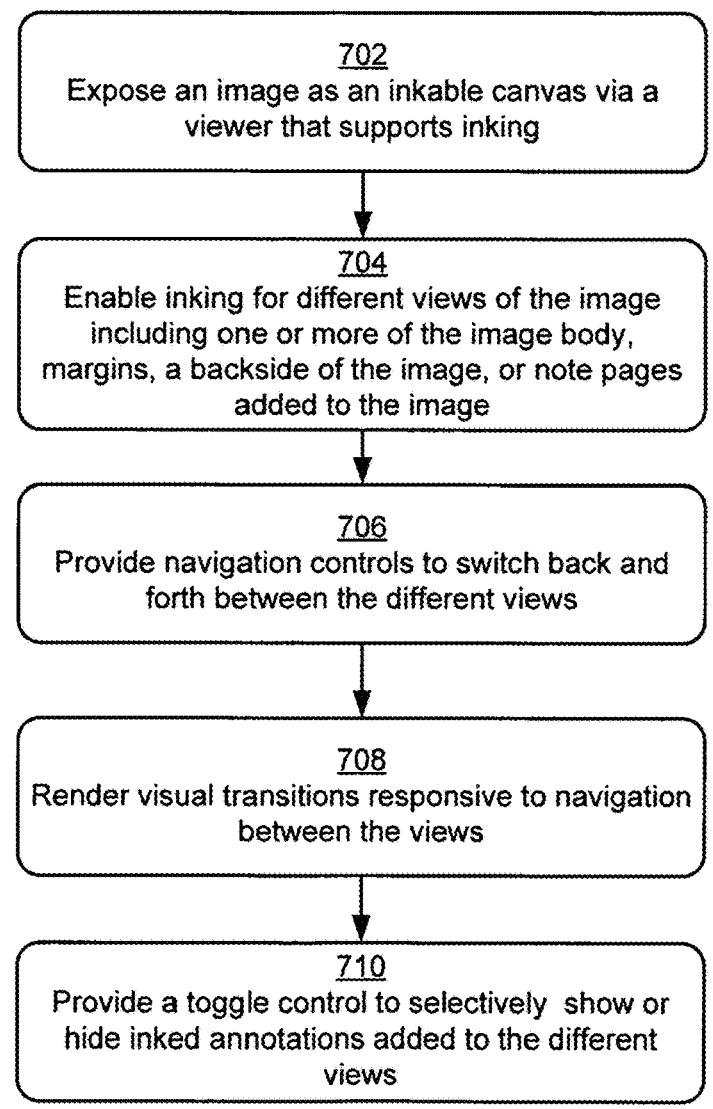
FIG. 7 is a flow diagram that describes a procedure for managing different views of an image that may include inked annotations in accordance with one or more implementations.

FIG. 7 is a flow diagram that describes a procedure 700 for managing different views of an image that may include inked annotations in accordance with one or more implementations. An image is exposed as an inkable canvas via a viewer that supports inking (block 702). Inking is enabled for different views of the image including one or more of the image body, margins, a back side of the image, or note pages added to the image (block 704). Additionally, navigation controls are provided to switch back and forth between the different views (block 706). Visual transitions are rendered responsive to navigation between the views (block 708). A toggle control is provided to selectively show or hide inked annotations added to the different views (block 710). Thus, inked annotations can be added in different views (front, back, notes, paginated, tabbed, etc.) via an image viewer 122 that makes used of an ink module 118 as discussed herein. Controls are provided to switch between the views and also turn the annotation on/off in the different views. As noted previously, animations and transitions can be employed as a user navigates to different views to represent switching between the views.

Accordingly, the image viewer and inked annotation as described above and below enable a visual experience for displaying and interacting with digital images via different views in a manner that is akin to interacting with physical photos. The visual experience includes views to associate an image with and present margins, a back side, and additional note pages for the image and provide controls to enable switching between various views supported by the visual experience. To do so, the image viewer 122 is configured to render an image as part of a "virtual canvas" comprised of several digital pages or multiple layers.

A first page is the image body itself. The image can be rendered as a framed picture with margins portions that can be added to the image as a separate page or layer. The margins provide additional space to ink that does not interfere with image content. Examples of margin portions that may be employed for inked annotations were previously discussed in relation to FIG. 3. In an implementation, margin portions are configurable to vary the dimensions and locations of the margins associated with the image. For example, various controls may be provide to enable users to turn margins on/off, set which of the margins appear (e.g., top, bottom, left, right), and select margins sizes (e.g., height and width).

In addition or alternatively, the image viewer 122 may be configured to support a back side page or layer, an example of which was also depicted and previously discussed in relation to FIG. 3. In one approach, a navigation control (e.g., a button or selectable icon) is provided to enable switching to a back side view, such as in the example of FIG. 3. In addition or alternatively, a natural gesture may be implemented such as a page turning swipe gesture or grabbing and flipping of a corner of the image to effectuate a switch between virtual sides of the image. Responsive to selection of the navigation control or recognition of an appropriate gesture, a transition is initiated to represent switching from the front side to the back side, or vice versa. In implementations, the transition is an animated transition whereby the photo, along with its, frame, margins and annotations is rotated in virtual three-dimensional space until the opposite side is visible. When the back side is exposed, additional space is provided in which users may add ink annotations. The back side is initially blank and thereafter populated with whatever annotations a user chooses to add to the back side.

The image viewer 122 may additionally be configured to support additional note pages or layers. The note pages are empty pages that may be selectively "pinned" to the original image in order to create further space for additional annotations. Examples related to additional note pages were depicted and previously discussed in relation to FIG. 4. The note pages enable users to pin any number of additional pages for annotations to an image (effectively unlimited number of within size/storage constraints). The note pages may be employed for various scenarios, such as keeping detailed diaries or storing extended narratives in association with images.

Figure 8:
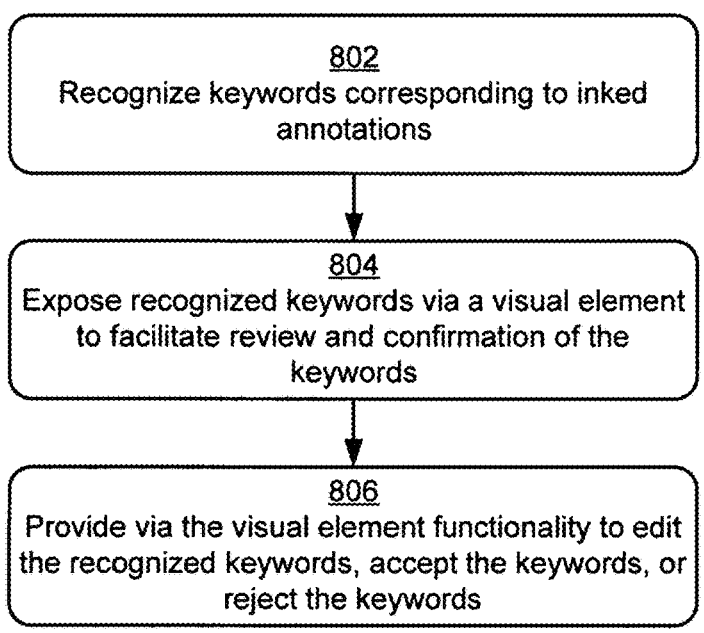
FIG. 8 is a flow diagram that describes a procedure for confirming keywords extracted from inked annotations before saving in accordance with one or more implementations.

FIG. 8 is a flow diagram that describes a procedure 800 for confirming keywords extracted from inked annotations before saving in accordance with one or more implementations. Keywords corresponding to inked annotations recognized (block 802). The recognized keywords are exposed via a visual element to facilitate review and confirmation of the keywords (block 804) and functionality is provided via the visual element to edit the recognized keywords, accept the keywords, or reject the keywords (block 806). In this manner, a user can review keywords recognized by a recognition module 118 from inked annotations before they are saved as metadata. This can occur via a pop-up balloon, toast element, side bar or other visual element suitable to display keywords/metadata. Through suitably configured visual element, the user can confirm or reject the keywords, perform editing, and/or delete a corresponding annotation.

Figure 9:
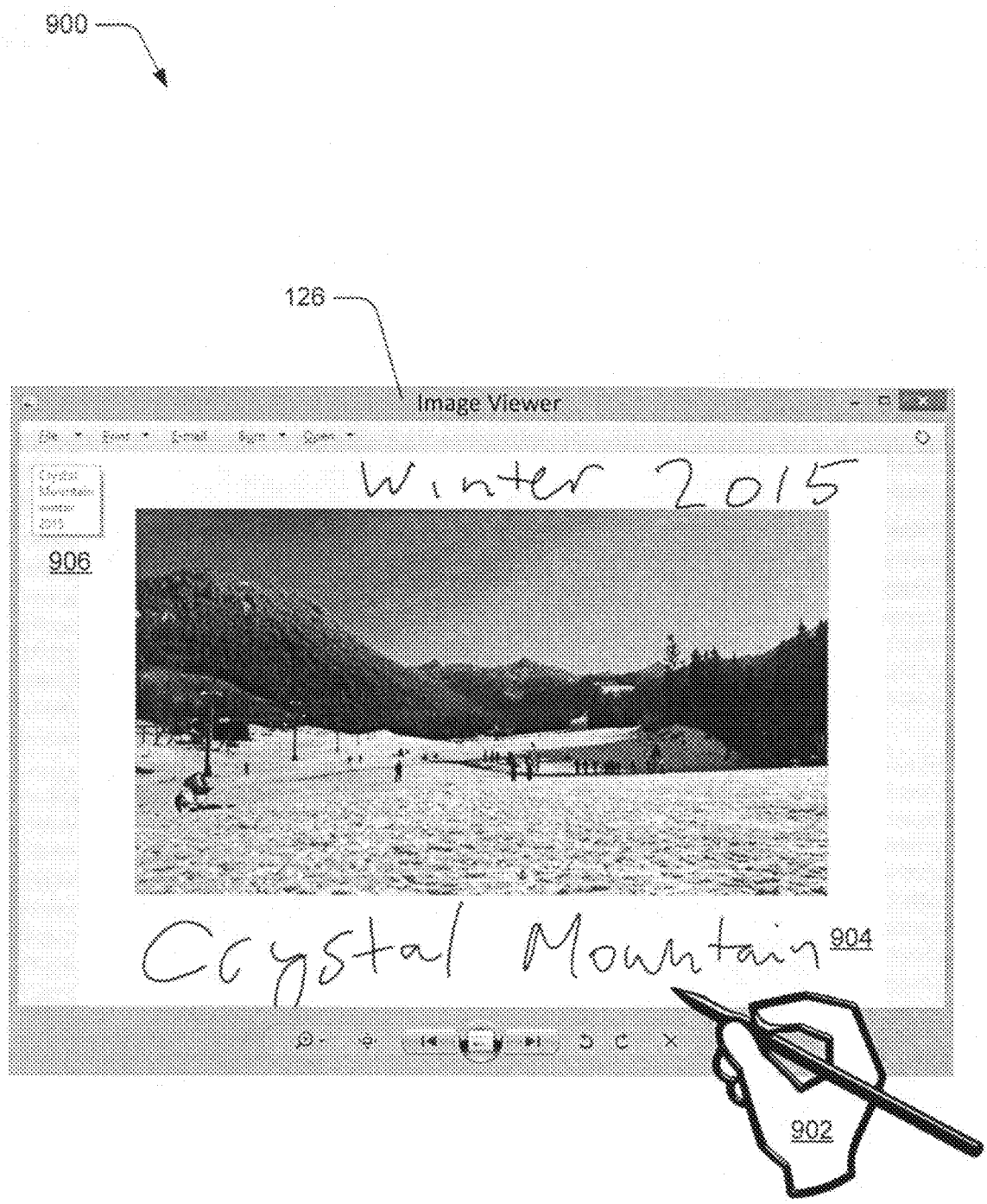
FIG. 9 depicts an example scenario for adding inked annotations to a front side of an image in accordance with one or more implementations.

Some additional examples and details are shown in relation to example scenarios of FIGS. 9 to 13. In particular, FIG. 9 depicts an example scenario for adding inked annotations to a front side of an image in accordance with one or more implementations. In particular, a user interface 126 corresponding to an image viewer 122 is represented as displaying an image. The image viewer supports inked annotations as discussed herein. Accordingly, interaction 902 causes addition of inked annotations 904 to the displayed image 123. Handwriting recognition via a recognition module 120 may be performed to derive keywords as noted previously. In this example, a visual element 906 in the form of a text box is exposed to present the keywords that are recognized. As noted previously, the visual element 906 can be configured to enable confirmation of the keywords, editing, deletion, and so forth before the keywords are saved.

Figure 10:
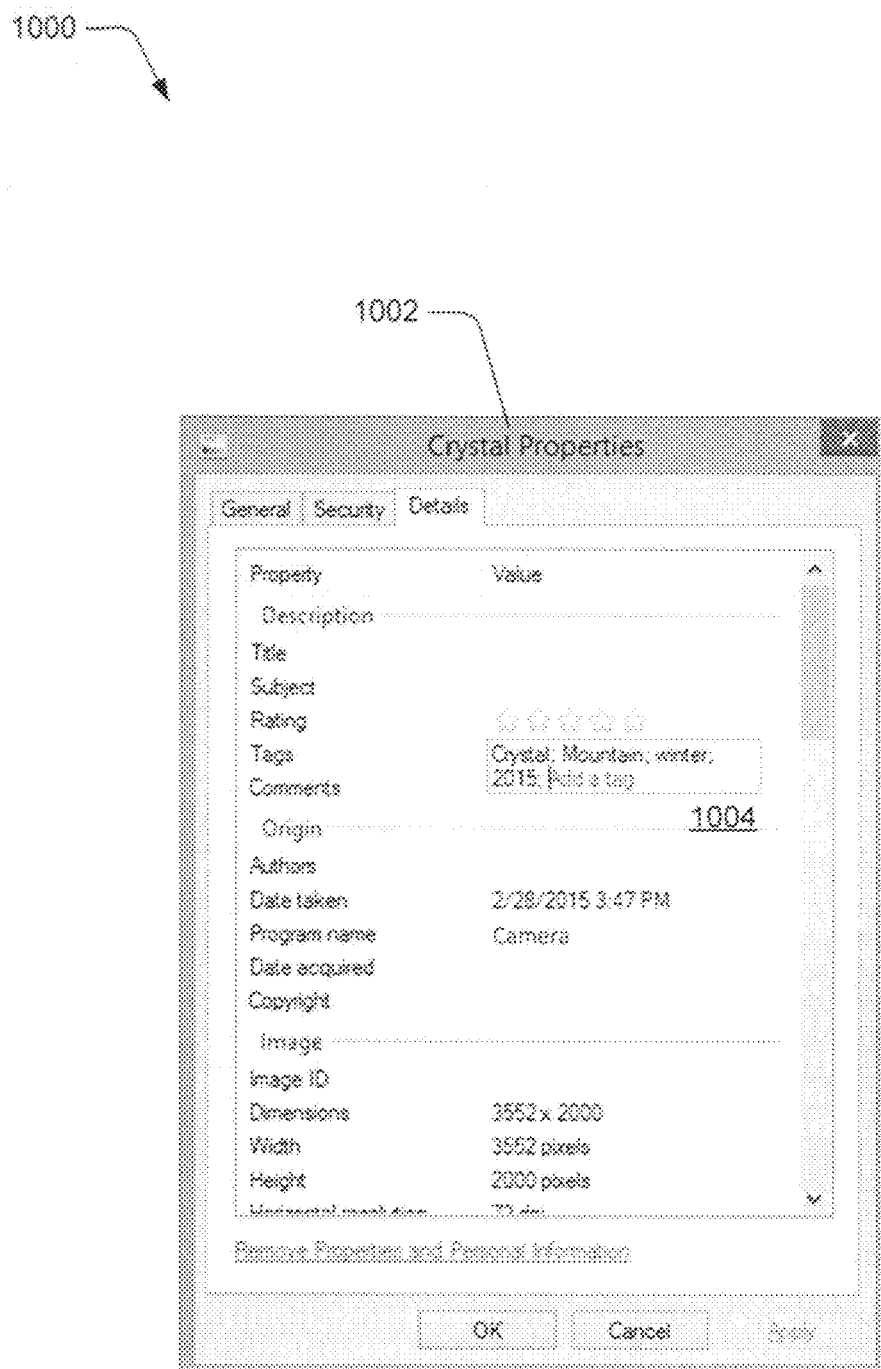
FIG. 10 depicts an example image properties user interface for an in accordance with one or more implementations.

When keywords are accepted or automatically saved, the keywords become part of image metadata. The keywords can be displayed along with other properties and utilized to support a variety of keyword/metadata based operations. To illustrate this, FIG. 10 depicts generally at 1000 an example image properties user interface 1002 for an image in accordance with one or more implementations. Here, the keywords or metadata tags recognized in the example of FIG. 9 are shown in the properties window via a text box 1004. The text box 1004 can be configured to enable addition of keywords, as well as editing or deletions of the recognized keywords.

Figure 11:
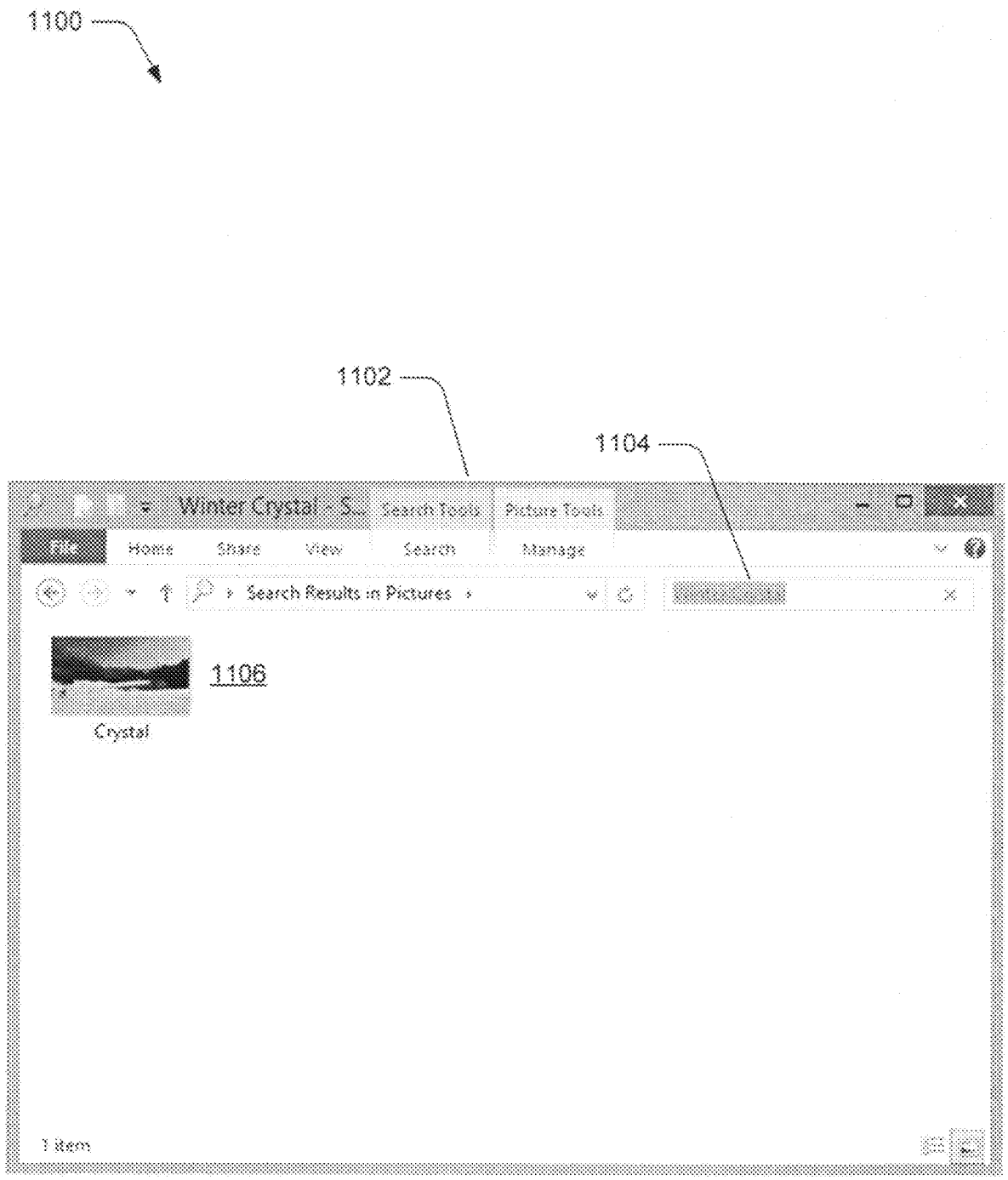
FIG. 11 depicts an example search user interface for image management in accordance with one or more implementations.

The keywords extracted from an annotations as represented in FIG. 9. are searchable. To illustrate this, FIG. 11 depicts generally at 1100 an example search user interface 1102 for image management in accordance with one or more implementations. Search user interface 1102 provides functionality to search a collection of items and/or an entire file system to find items based on input keywords. Here, search input box 1104 is shown as having terms input for a search that correspond to keywords "winter" and "crystal." These terms match the keywords that are extracted from the inked annotation 902 of FIG. 9 and saved as metadata for the image. Accordingly, search results 1106 are represented as including a thumbnail view of the corresponding image 123. Notice that in this thumbnail view, the annotations do not appear since the annotations would be too small to be legible. Therefore, the system does not render the annotations in such situations. Interaction with the thumbnail may cause navigation to a full view of the image, such as to launch the image viewer 122 and render the view as in FIG. 9 that does show the annotations.

In one or more implementations, searches via a suitably configured user interface may be conducted based on input of inked search queries. In accordance with techniques described herein, OCR can be applied to inked annotations to recognize corresponding textual strings. Extending these concepts to a search context, search terms input as ink runs may be converted to textual terms that may be used to drive a corresponding search. In this approach, a search input box provided for searching images, web pages, documents, or other content searching may be configured to accept and process search queries as ink runs. The search input box may an area of suitable size in which a user may input an inked, handwritten string to initiate a search. The particular size of the search input box may vary depending upon the application and may also be adjustable by a user in some implementations. In operation, a user inputs an ink run within the search input box inking area. As with inked annotation, ink point coordinates for ink runs are captured between "pen-down" and "pen-up" events. The captured ink data is stored together as an ink object or document. Ink runs are rendered using curve fitting to produce smooth ink representation in the search input box.

When a "pen-up" even is received, OCR is applied to the ink to generate one or more textual strings/terms from the input ink. The terms derived based on the OCR may be used to conduct a search of a corpus of content items. In an implementation, textual strings that are generated as search terms may be displayed via a visual element (e.g., text box, window, pane, bar, etc.) to expose the recognized terms to the user. As with inked annotation, controls may be provided to enable a user to confirm and or modify the search terms produced by OCR prior to launching the search. Upon receiving a selection to confirm the terms (e.g., selection of an enter or search button), the search is conducted based upon textual strings that are derived from the input ink run.

Search results are obtained for the search and may be displayed via the user interface various ways. For example, results of the search may be displayed in a vertical list containing a file name and path, file size, file type, file thumbnail and a summary description generated from a combination of the search terms and content of items identified by the search. In the case of an image or document search, thumbnails of the returned items may also be displayed. The ink-based search techniques may be applied in a variety of search contexts including by way of example and not limitation, searching for web content via a web browser, searching a collection of items such as documents, images, or media files, file system searches, and application specific searches such as searching for "apps" within an app store application or searching for locations in a map application.

Figure 12:
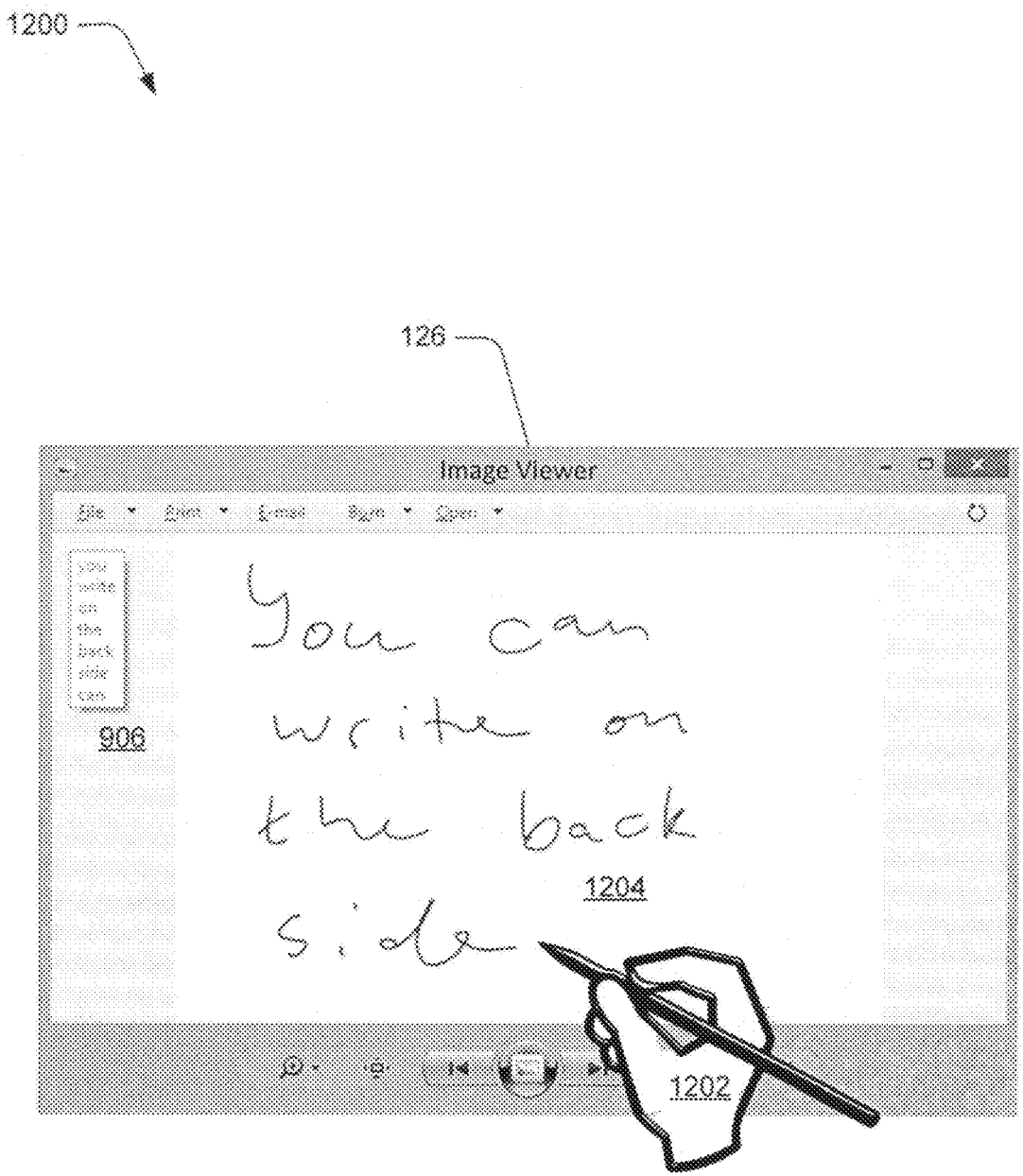
FIG. 12 depicts an example scenario for adding inked annotations to a back side (e.g., reverse side) of an image in accordance with one or more implementations.

FIG. 12 depicts generally at 1200 an example scenario for adding inked annotations to a back side (e.g., reverse side) of an image in accordance with one or more implementations. In particular, a user interface 126 corresponding to an image viewer 122 is again represented as displaying the image of FIG. 9, this time with the back side exposed. Various controls and elements may be employed to enable switching between views as noted previously, including switching back and forth between the front and back views of the image. Here, interaction 1202 causes addition of an inked annotation 1204 to the displayed image 123. Again, handwriting recognition can be applied via a recognition module 120 and extracted keywords can be displayed for confirmation via a visual element 906 as illustrated in FIG. 12. The extracted keywords presented via the visual element 906 reflect the results of OCR applied to the inked annotation 1204 in the manner previously described.

Figure 13:
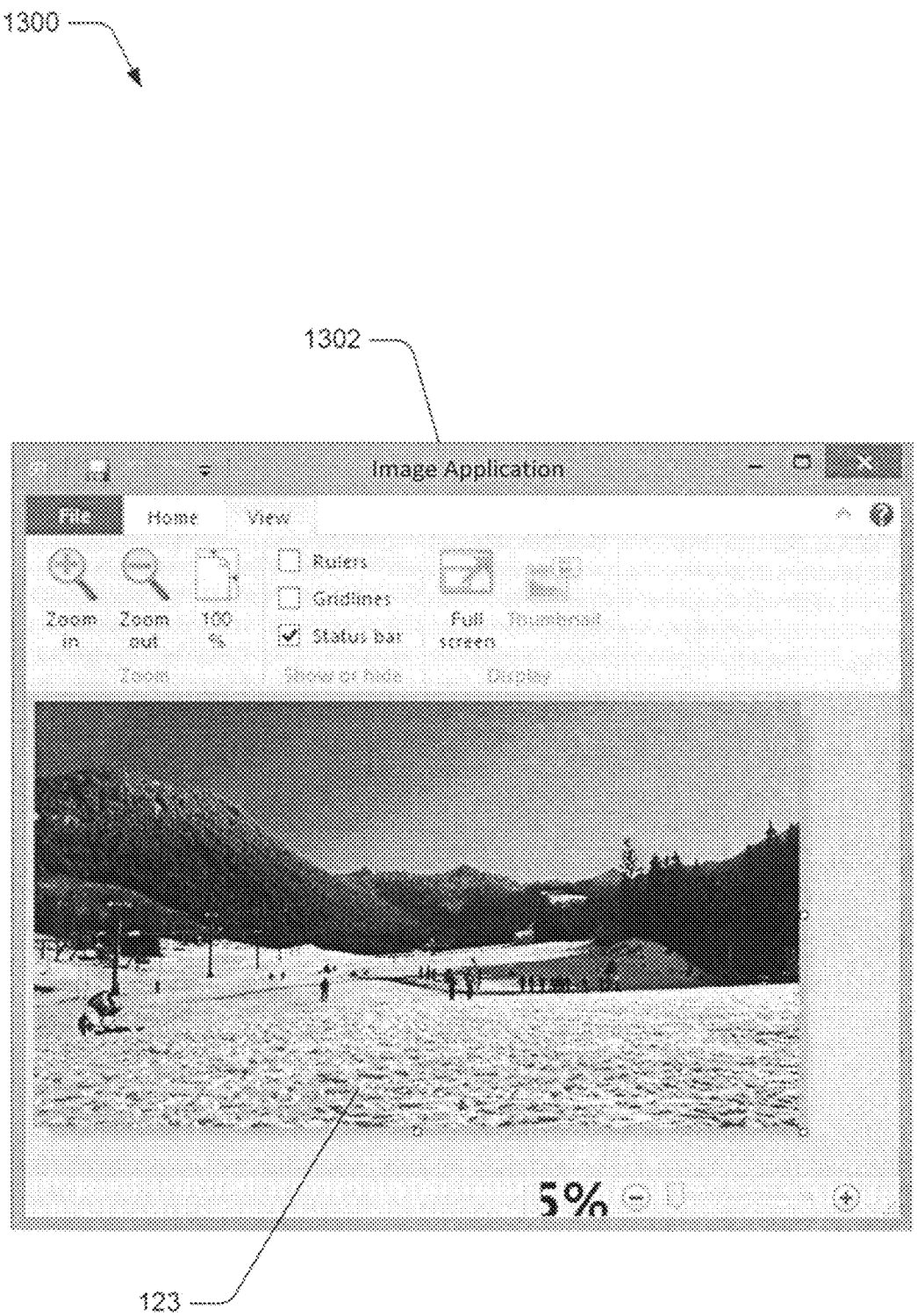
FIG. 13 depicts an example scenario in which an image application can display an image without corresponding inked annotations in accordance with one or more implementations.

As noted, inked annotation data is separated from image data for an image. Accordingly, the original image is available for printing and display without ink, and the ink does not interfere with programs that are not aware of the ability to associate ink with photos. An image application that is not ink-aware may not be configured to even recognize ink annotations or may ignore ink annotations blocks. As such, applications that are not ink-aware handle the image data blocks in a typical manner. This is represented by FIG. 13, which depicts generally at 1300 an example scenario in which an image application can display an image without corresponding inked annotations. Here, a user interface 1302 is depicted that corresponds to an image application that does not support inked annotations. Accordingly, the image 123 annotated per the scenario of FIG. 9 is presented via this user interface 1302 without rendering of the inked annotations 904. Thus, applications that are not compatible with inked annotations can still handle images having inked annotations in a traditional way. Similarly, applications that are aware of inked annotations can provide functionality to turn display of the annotations on/off in different views.

Having considered the foregoing details and procedures, consider now example system and components associated with one or more implementations of ink experiences for images.

Example System and Device

Figure 14:
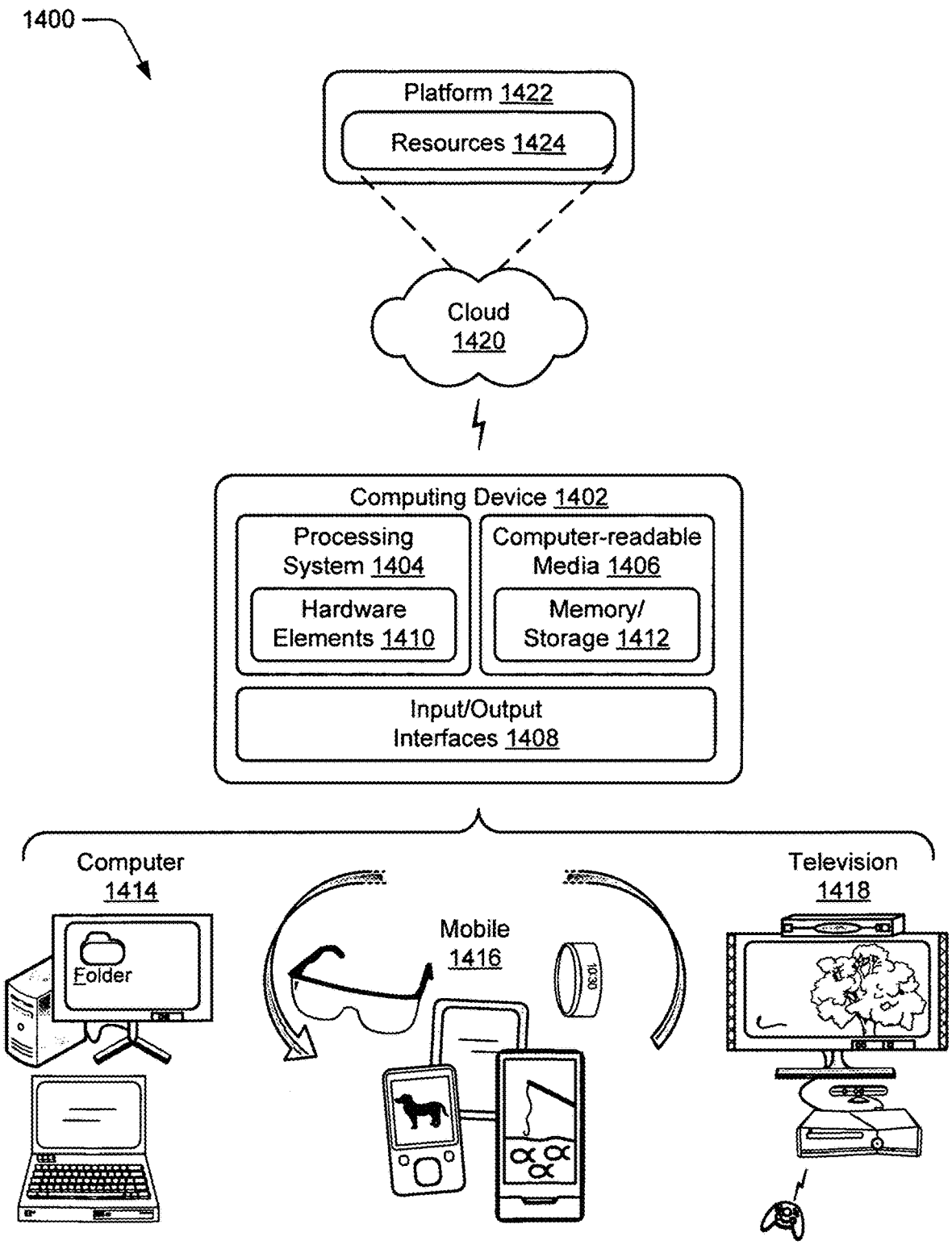
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102, ink module 118, recognition module 120, and/or image viewer 122 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

EXAMPLE IMPLEMENTATIONS

Example implementations of techniques described herein include, but are not limited to, one or any combinations of one or more of the following examples:

Example 1

A system comprising: a display; and one or more processors in communication with the display, the one or more processors configured to: display an image on the display via a viewing application; enable an inking mode for adding inked annotations to the image, the inking mode supporting addition of annotations to at least front side and back side representations of the image; obtain input to apply one or more inked annotations to the image; and append data blocks corresponding to the one or more inked annotations as additional data blocks for the image.

Example 2

The system as described in any one or more of the examples in this section, wherein the data blocks corresponding to the one or more inked annotations includes indications of locations for the inked annotations.

Example 3

The system as described in any one or more of the examples in this section, wherein the viewing application is configured to animate transitions between the front side and back side representations of the image.

Example 4

The system as described in any one or more of the examples in this section, wherein the inking mode further supports association of one or more note elements with the image and creation of inked annotations on the note elements.

Example 5

The system as described in any one or more of the examples in this section, wherein the inked annotations are stored a vector objects that enable repositioning within the image, resizing, recoloring, and deletion of the inked annotations.

Example 6

The system as described in any one or more of the examples in this section, wherein the original image is not altered by inked annotations added to the image.

Example 7

The system as described in any one or more of the examples in this section, wherein ink data blocks for the inked annotations are appended to image data for the image as input of the ink content occurs.

Example 8

The system as described in any one or more of the examples in this section, wherein the one or more processors are further configured to: enable inking for different views of the image including one or more of the image body, margins, a back side of the image, or note pages added to the image; provide navigation controls to switch back and forth between the different view; render visual transitions responsive to navigation between the views; and provide a toggle control to selectively show or hide inked annotations added to the different views.

Example 9

The system as described in claim 1, wherein the one or more processors are further configured to: apply handwriting recognition to inked annotations added to the image; extract keywords corresponding to the inked annotations; and store the keywords as metadata for the image.

Example 10

The system as described in any one or more of the examples in this section, wherein the one or more processors are further configured to: enable keyword based photo management operations using the extracted keywords including one or a combination of searching, filtering, categorizing, and sorting.

Example 11

The system as described in any one or more of the examples in this section, wherein the one or more processors are further configured to: prior to storing the keywords, expose recognized keywords via a visual element to facilitate review and confirmation of the keywords, wherein the storing of the keywords as metadata for the image occurs responsive to confirmation via the visual element.

Example 12

The system as described in any one or more of the examples in this section, wherein the one or more processors are further configured to: provide via the visual element functionality to edit the recognized keywords, accept the keywords, or reject the keywords.

Example 13

The system as described in any one or more of the examples in this section, wherein inked annotations are saved automatically without an explicit selection of a save command.

Example 14

The system as described in any one or more of the examples in this section, wherein the inked annotations are usable by applications that support inking features and do not interfere with handling of images by applications that do not support inking features.

Example 15

The system as described in any one or more of the examples in this section, wherein rendering of the inked annotations is bypassed in thumbnail views and other views of the image that result in illegible representations of the inked annotations.

Example 16

A computer-implemented method, comprising: displaying an image via a viewing application; enabling an inking mode for adding inked annotations to the image including enabling inking for different views of the image including representations of the image body, margins, a back side of the image, and note pages added to the image; obtaining input to apply one or more inked annotations to the image; and appending data blocks corresponding to the one or more inked annotations as additional data blocks for the image.

Example 17

The computer-implemented method of any one or more of the examples in this section, further comprising: applying handwriting recognition to inked annotations added to the image displayed via the viewing application; extracting keywords corresponding to the inked annotations; storing the keywords as metadata for the image; and enabling keyword based photo management operations using the extracted keywords including one or a combination of searching, filtering, categorizing, and sorting.

Example 18

The computer-implemented method of any one or more of the examples in this section, further comprising: applying the handwriting recognition to recognize keywords corresponding to the inked annotations in real-time as the input to add the inked annotations is obtained; exposing recognized keywords via a visual element to facilitate review and confirmation of the keywords; and providing via the visual element functionality to edit the recognized keywords, accept the keywords, and reject the keywords.

Example 19

The computer-implemented method of any one or more of the examples in this section, further comprising: providing navigation controls to switch back and forth between the different views; and rendering visual transitions responsive to navigation between the views.

Example 20

One or more computer-readable storage media storing computer-executable instructions that, responsive to execution by a computing device, cause the computing device to perform operations comprising: exposing an image as an inkable canvas via a viewer that supports inking; enabling inking for different views of the image including one or more of the image body, margins, a back side of the image, or note pages added to the image; providing navigation controls to switch back and forth between the different views; rendering visual transitions responsive to navigation between the views; and providing a toggle control to selectively show or hide inked annotations added to the different views.

CONCLUSION

Although details are described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A system comprising:
one or more processors; and
one or more computer-readable storage media storing computer-executable instructions which, when executed by the one or more processors, cause the one or more processors to:
display on a display a first view including an inkable representation of a virtual back side of a first digital image stored as image data blocks in an image file for adding back side inked annotations to the virtual back side of the first digital image, wherein the image file includes metadata and image data including the image data blocks;
obtain, while the first view is displayed, first input for a first ink run via the first view for adding a first back side inked annotation to the virtual back side of the first digital image;
store the first ink run in association with the first digital image in the image file by appending, in real-time as the first input is obtained, ink data blocks corresponding to the first ink run to the image data separate from the image data blocks storing the first digital image;
apply handwriting recognition to the first back side inked annotation, in real-time as the first input is obtained, to recognize one or more first keywords corresponding to the first back side inked annotation;
expose the recognized one or more first keywords via a visual element enabling confirmation of the recognized one or more first keywords; and
store the one or more first keywords in the metadata included in the image file responsive to confirmation via the visual element.

2. The system as described in claim 1, wherein the displaying of the first view includes displaying a faded and flipped representation of the first digital image within the inkable representation of the virtual back side of the first digital image.

3. The system as described in claim 1, wherein the first ink run is stored in the image file as vector objects that enable repositioning within the first digital image, resizing, recoloring, and deletion of the first ink run.

4. The system as described in claim 1, wherein the instructions further cause the one or more processors to:
display on the display a second view including a second inkable canvas presenting a virtual front side of the first digital image surrounded by a virtual border and/or margin providing additional space for inked annotations;
provide a navigation control to enable switching to the second view; and
render a visual transition, in response to a user selection of the navigation control, from displaying a third view including an inkable representation of the first image to displaying the second view.

5. The system as described in claim 1, wherein the instructions further cause the one or more processors to:
enable keyword-based photo management operations using the recognized one or more first keywords including one or a combination of searching, filtering, categorizing, and sorting.

6. The system as described in claim 1, wherein the back side inked annotations are usable by applications that support inking features and do not interfere with handling of the image by applications that do not support inking features.

7. The system as described in claim 1, wherein the instructions further cause the one or more processors to:
prior to the storing the first ink run and in response to a determination that the image file includes no existing ink data blocks, set a file pointer for writing to the image file to a first file pointer location at an end of the image file, wherein:
the ink data blocks include a first ink data block, and
the appending the ink data blocks includes writing the first ink data block beginning at the first file pointer location.

8. A system comprising:
one or more processors; and
one or more computer-readable storage media storing computer-executable instructions which, when executed by the one or more processors, cause the one or more processors to:
display on a display a first view including an inkable representation of a virtual back side of a first digital image stored as image data blocks in an image file for adding back side inked annotations to the virtual back side of the first digital image, wherein the image file includes metadata and image data including the image data blocks;
obtain, while the first view is displayed, first input for a first ink run via the first view for adding a first back side inked annotation to the virtual back side of the first digital image;
store the first ink run in association with the first digital image in the image file by appending, in real-time as the first input is obtained, ink data blocks corresponding to the first ink run to the image data separate from the image data blocks storing the first digital image;
display on the display a second view including an inkable representation of a virtual front side of the first digital image displaying the first digital image as a second inkable canvas for adding front side inked annotations to the virtual front side of the first digital image;
render a visual transition, in response to a user selection, from displaying the second view to displaying the first view;
obtain, while the second view is displayed, second input for a second ink run via the second view for adding a first front side inked annotation to the virtual front side of the first digital image;
apply handwriting recognition to the first front side inked annotation, in real-time as the second input is obtained, to recognize one or more second keywords corresponding to the first front side inked annotation;
expose the recognized one or more second keywords via a visual element enabling rejection of the one or more second keywords without storing rejected second keywords in the metadata included in the image file.

9. The system as described in claim 8, wherein the transition is an animated transition whereby the virtual front side is rotated in virtual three-dimensional space until the virtual back side is visible.

10. The system as described in claim 8, wherein rendering of the front side inked annotations is bypassed in thumbnail views and other views of the first digital image that result in illegible representations of the front side inked annotations.

11. A computer-implemented method, comprising:
displaying a first view including an inkable representation of a virtual back side of a first digital image stored as image data blocks in an image file for adding back side inked annotations to the virtual back side of the first digital image, wherein the image file includes metadata and image data including the image data blocks;

obtaining, while the first view is displayed, input for a first ink run via the first view for adding a first back side inked annotation to the virtual back side of the first digital image;

storing the first ink run in association with the first digital image in the image file by appending, in real-time as the input is obtained, ink data blocks corresponding to the first ink run to the image data separate from the image data blocks storing the first digital image;

applying handwriting recognition to the first ink run, in real-time as the input is obtained, to recognize a textual string corresponding to the first ink run;

extracting one or more keywords based on the handwriting recognition applied to the first ink run;

exposing the extracted one or more keywords via a visual element enabling confirmation of the extracted one or more keywords, providing functionality to edit the extracted one or more keywords, and enabling rejection of the extracted one or more keywords; and storing the extracted one or more first keywords in the metadata included in the image file responsive to confirmation via the visual element.

12. The computer-implemented method of claim 11, further comprising:

displaying a second view including a second inkable canvas presenting a virtual front side of the first digital image surrounded by a virtual border and/or margin providing additional space for inked annotations;

providing a navigation control to enable switching to the second view; and rendering a visual transition, in response to a user selection of the navigation control, from displaying a third view including an inkable representation of the first image to displaying the second view.

* * * * *